United States Patent Office 3,140,158
Patented July 7, 1964

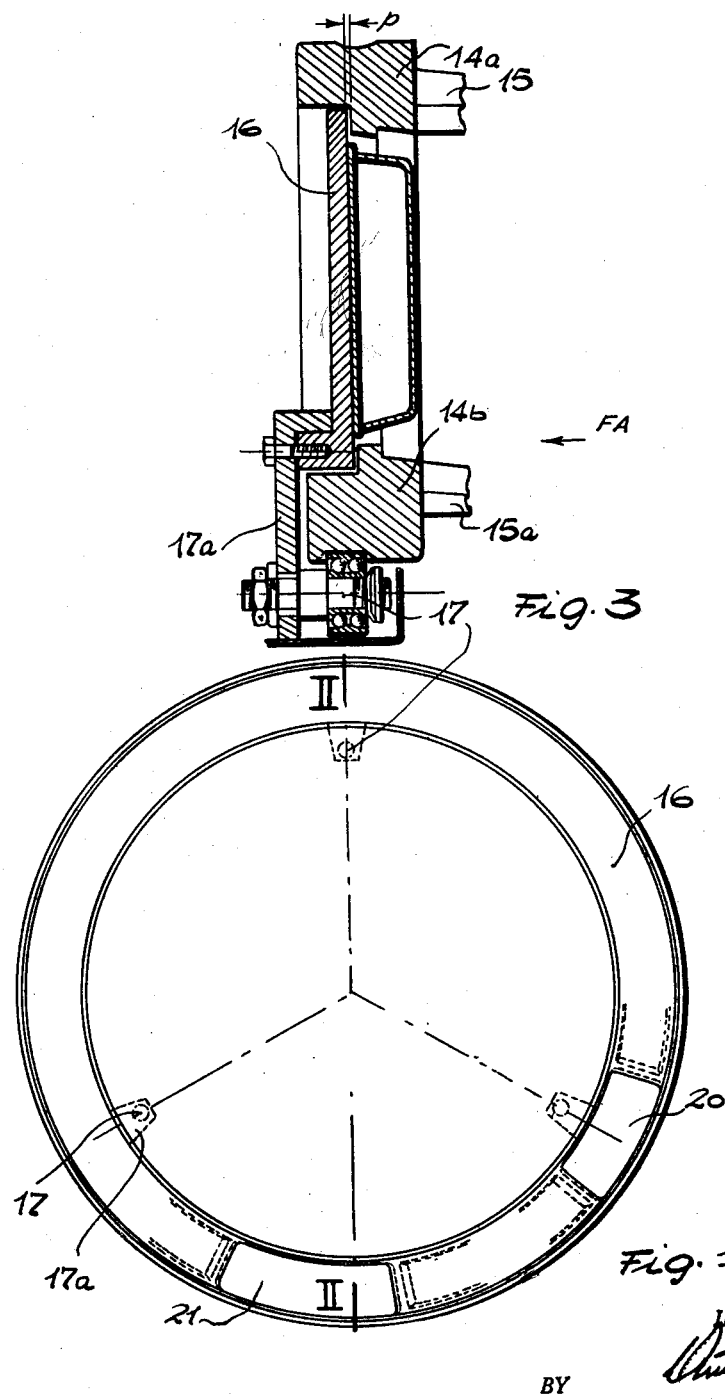

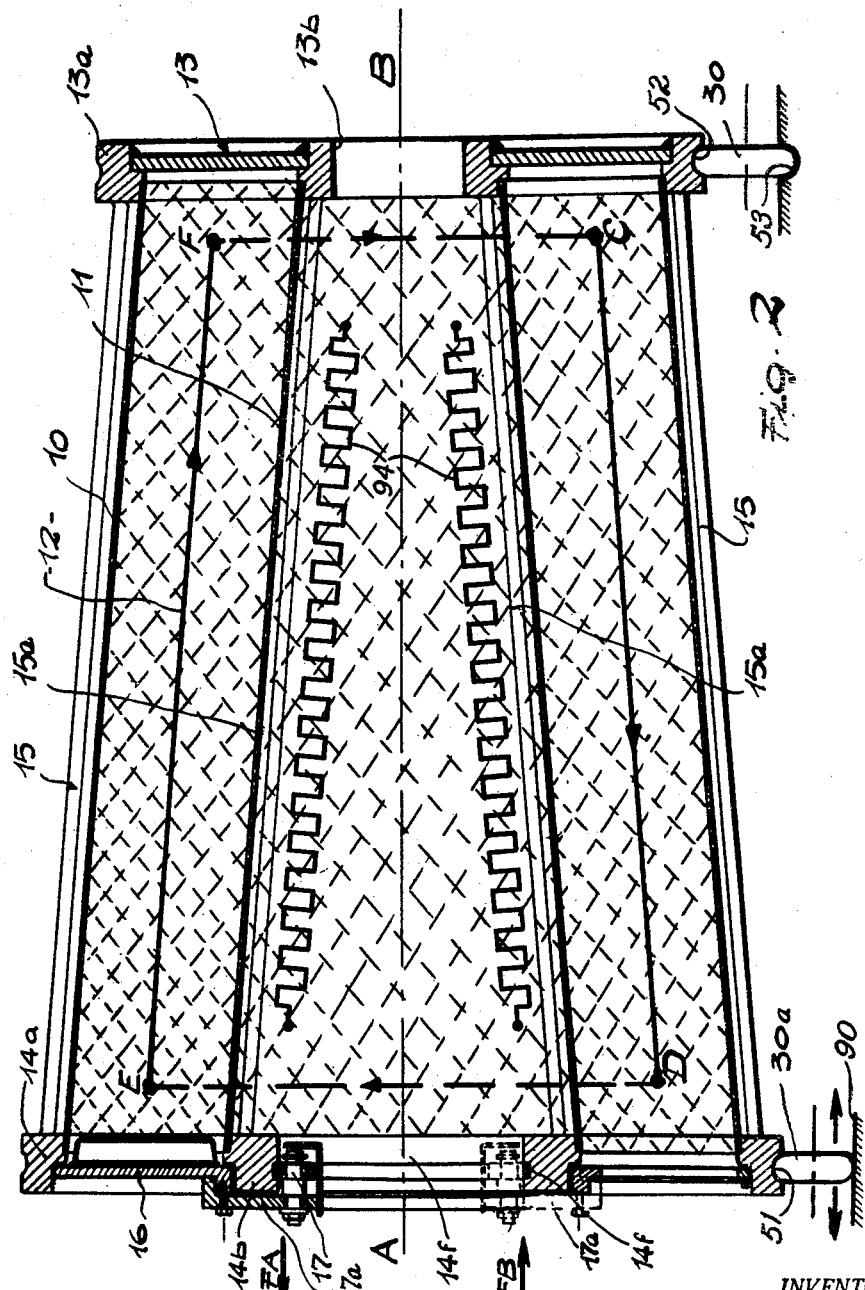

3,140,158
FORAMINOUS ROTARY DRUM DRYER
Antonio Scolari, % Ing. A. Giambrocono, Via Durini 4, Milan, Italy
Filed Nov. 7, 1960, Ser. No. 67,629
Claims priority, application Italy Dec. 19, 1959
1 Claim. (Cl. 34—128)

The present invention concerns rotary drum torrefactors, particularly coffee bean roasters.

In rotary drum torrefactors difficulties of a functional and constructional order are encountered, namely, the mass of seeds or beans to be roasted is not mixed sufficiently unless internal agitators or the like are used, and, serious difficulties are experienced due to thermal expansion during heating up the torrefactor.

According to the known techniques, revolving drums are known, the basket of which carries a stationary closure plate, in which there is an aperture for discharging the roasted material. The basket of the drum is so made as to fit the surface of the plate so that the seeds to be roasted are prevented from penetrating between the basket and the said plate and being crushed during the rotation of the drum. In order to obtain the said perfect fit, the basket must be heated, the adjoining surfaces of the basket and the said plate adjusted before the coffee is introduced. These operations require a great outlay of time and the employment of skilled labour.

Another inconvenience inherent with known drums consists in the fact that the structure of the roaster is heavy and requires, therefore, the use of a high power motive unit. It is an object of the invention to provide an improved light-weight rotary drum torrefactor using perforated drums.

According to the present invention there is a torrefactor of the type comprising a drum rotatable about a horizontal axis which drum comprises two perforated frusto-conical sieves which are substantially coaxial about the said horizontal axis and define an annular space therebetween adapted for coffee beans to be charged therein for roasting.

The provision of a drum fitted with sieves allows all of the impurities to be automatically extracted from the beans to be roasted, as it allows of the direct discharge of the husks formed during the roasting operation. Further the torrefactor may be heated by thermal radiation with great efficiency because the metal sieves do no cut off so much radiation, and because the mass to be roasted disposes itself in a thin layer, easily irradiated both from the outside and from the inside.

Thus the thermal mass of the whole drum can be negligible and it is, therefore, possible to cool the mass of the roasted beans directly within the drum itself, i.e. without emptying it, which offers noticeable advantages, both in the constructional simplicity of the whole torrefactor and in the homogeneity of the toasted product.

The invention will be described by way of example with reference to the accompanying drawings in which:

FIG. 1 represents, schematically and in a front view a rotary drum torrefactor according to the invention;

FIG. 2 is an axial section along line II—II of FIG. 1; and

FIG. 3 represents on a larger scale a detail of FIG. 2.

Referring to FIG. 2 it is observed that the torrefactor according to my invention comprises two wire sieves 10, 11 delimiting between them a chamber 12 within which coffee beans are charged to be roasted. The sieves 10, 11 are formed as two co-axial cone-frustums having a horizontal axis A—B and the chamber 12 is closed by an annular plate 13 at their smaller ends, which plate is welded to two annular rings 13a, 13b, respectively fixed to the sieves 10, 11. Similarly the edge of the larger end of the sieve 10 is fixed to a ring 14a and the edge of the larger end of the sieve 11 is fixed to a ring 14b, the said rings 14a and 14b being connected respectively to the rings 13a, 13b by bars or spokes 15, 15a for stiffening purposes. A closure ring or annular plate 16 for the larger end of the drum is provided which closure ring makes contact with the ring 14b through three ball bearings 17 mounted on lugs 17a secured to the ring 16 and running in a circular cavity 14f formed in the ring 14b. The drum is rotatably mounted on two pairs of rollers 30, 30a which engage respectively grooves 52, 52a in the rings 13a and 14a. The pairs of rollers associated with the ring 13a also engage a groove 53 in a supporting surface of the machine frame 90, but the pair 30a associated with the ring 14a do not engage grooves in their supporting surface and are free to move along it, in a direction parallel with their axes, in response to thermal expansion or contraction of the drum. The ball bearings 17 are mounted in brackets 17a fixed to the closure ring 16.

It will easily be understood that when the rings 14b and 16 will move in the direction of the arrow FA or in the direction of the arrow FB as a consequence of the thermal expansion or contraction of the entire drum, the closure ring 16 will receive identical displacements so that the play "p" between the ends of the sieves and the closure ring remains unaltered. The ring 16 (FIG. 1) has an aperture 20 for putting in the beans to be roasted and a discharge aperture 21, the apertures being controlled by slides operated from the outside (not represented on the drawing). During the rotation of the drum the ring 16 is kept stationary, i.e. it does not rotate with the torrefactor. The entire drum may be caused to revolve by any known means about the axis A—B. The provision of a drum having according to this invention, two coaxial frusto-conical sieves allows of a perfect intermixing of the mass of the beans to be roasted in a perfectly automatic manner. For instance, the beans will follow the path E, F, C, D due to the effects of gravity and the rotary movement of the drum. In general, no bean will remain stationary, but is forced to continuously move from one extremity of the drum to the other and from top to bottom. It will be realised that coffee charging and discharging operations are enormously facilitated and do not require accessories as in known torrefactors. It is possible to heat the coffee beans to be roasted by radiant heating elements arranged close to the sieve 11 on the side of the bars 15a and/or by heating elements outside of the sieve 10, whereby the coffee can be roasted in a relatively short period of time.

I claim:

A torrefactor for seeds by example for coffee seeds comprising in combination an inner and outer sieve tapering in the same direction from a larger end to a smaller end and mounted coaxial to one another so as to define therebetween a frustum cone chamber wherein the said seeds are discharged and thoroughly mixed during the rotation of the sieves;

a first closure ring rigidly fixed to and sealing the said sieves at their smaller ends, an annular support ring rigidly fixed to the larger end of the outer sieve, a further annular support ring rigidly fixed to the larger end of the said internal sieve, an annular groove formed from the said further annular support ring;

a second closure ring sealing the said outer and internal sieve at the said support rings, means being provided to prevent the said second closure ring only from a rotational displacement with the said sieves, but permitting an axial displacement therewith, the said means comprising a set of ball bearings connected to the said closure ring and engaging the said groove so that any contraction or dilatation of the said sieves is transmitted to the said closure ring thus letting unchanged the play between the second closure ring and the said further support rings;

first bearing means located at the smaller ends of the sieves allowing a rotation of the said sieves about the horizontal axis and locating the sieves axially, further bearing means located at the larger end of the sieves and permitting an axial displacement thereof;

a discharge and an inlet aperture to allow for loading and discharging of the torrefactor, and radiant means co-extensive with the said sieves.

References Cited in the file of this patent

UNITED STATES PATENTS

| | | |
|---|---|---|
| 590,134 | Crawley | Sept. 14, 1897 |
| 658,957 | Mey | Oct. 2, 1900 |
| 750,535 | Goings | Jan. 26, 1904 |
| 1,182,680 | Homings | May 9, 1916 |
| 1,623,017 | Cristoph | Dec. 14, 1925 |

FOREIGN PATENTS

| | | |
|---|---|---|
| 931 | Great Britain | A.D. 1908 |